H. C. VELIE.
HORSE HAY-RAKE.
No. 193,578. Patented July 24, 1877.
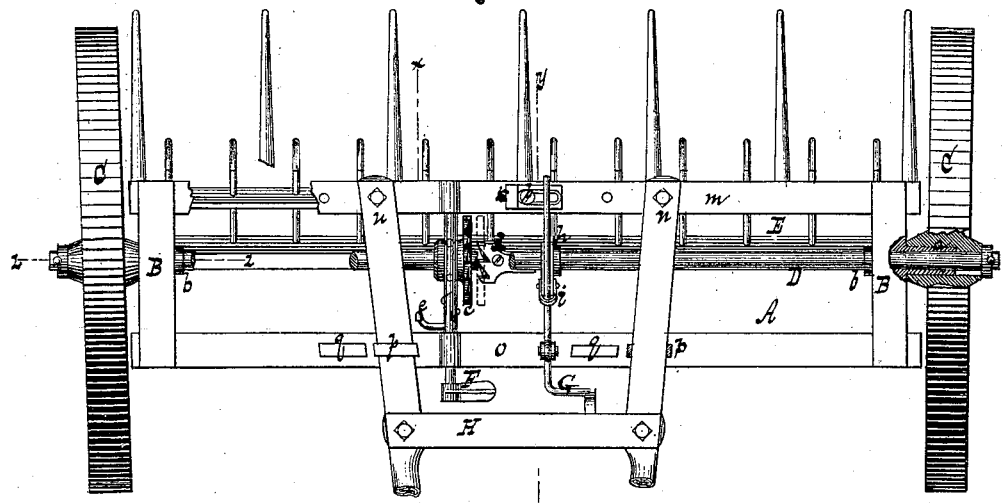
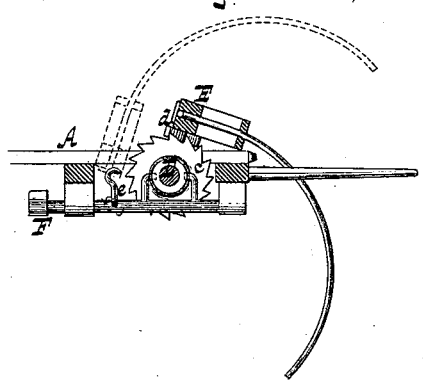
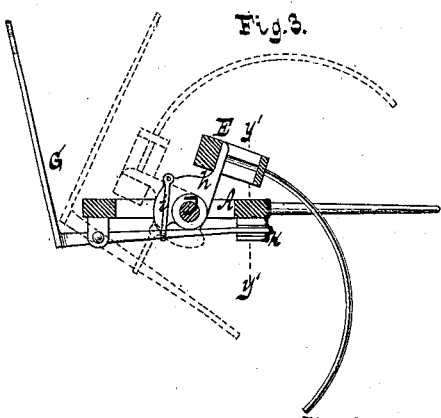
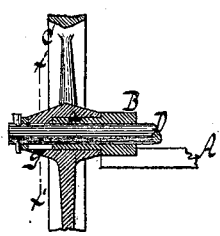
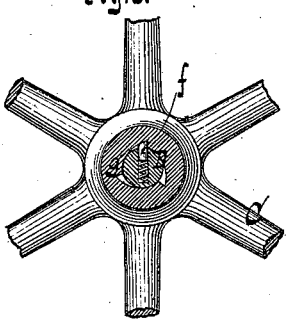
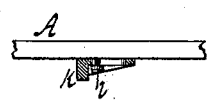
Witnesses.
Otto Aufeland.
Chas. Wahlers.
Inventor.
Henry C. Velie
by
Van Santvoord & Hauff
his attorneys.

UNITED STATES PATENT OFFICE.

HENRY C. VELIE, OF POUGHKEEPSIE, NEW YORK.

IMPROVEMENT IN HORSE HAY-RAKES.

Specification forming part of Letters Patent No. 193,578, dated July 24, 1877; application filed June 20, 1877.

*To all whom it may concern:*

Be it known that I, HENRY C. VELIE, of Poughkeepsie, in the county of Dutchess and State of New York, have invented a new and useful Improvement in Horse-Rakes, which improvement is fully set forth in the following specification, reference being had to the accompanying drawings, in which—

Figure 1 represents an inverted plan. Fig. 2 is a transverse vertical section in the plane $x\,x$, Fig. 1. Fig. 3 is a similar section in the plane $y\,y$, Fig. 1. Fig. 4 is a partial longitudinal vertical section in the plane $z\,z$, Fig. 1. Fig. 5 is a transverse section of the hub of one of the wheels in the plane $x'\,x'$, Fig. 4. Fig. 6 is a transverse section of the stop in the plane $y'\,y'$, Fig. 3.

Similar letters indicate corresponding parts.

This invention consists in the combination, in a horse-rake, of tubular projections, firmly connected to the main frame, with the wheels which are mounted on said tubular projections, and with a shaft which turns freely in these tubular projections, and which connects with the wheels by pawls and ratchets, and with the rake-head by suitable coupling mechanism, so that the shaft is relieved from all strain of the wheels, and the wheels can be "thrown in," causing the same to work easy when the load is on. The coupling mechanism which I use consists of a pinion which is feathered on the independent shaft, and of a segmental rack secured to the rake-head. From the coupling-lever projects an arm, which serves to release the coupling mechanism automatically when the contents of the rake have been dumped. With the frame of my rake and with its thill are combined additional staples, whereby said thill can be adjusted on one side of the frame, for the purpose of causing the horse to walk outside of the material to be raked.

In the drawing, the letter A designates the frame of my horse-rake. From the end pieces B of this frame extend tubular projections $a$, Fig. 4, which form the bearings for the wheels C, and which are bored out to receive the shaft D. The outer surfaces of the tubular projections are turned slightly eccentric from their bores, so that the wheels are thrown in below, and that they work easy under the load or strain to which they are subjected. If the wheels are mounted directly on the shaft D, they are liable to assume an inclined position from the top outward when the load is on, and thereby they are caused to work hard. Furthermore, by mounting the wheels on the tubular projections, the shaft D is rendered entirely independent, so that it works free and easy, and the rake can be operated with comparatively little power. On the shaft D are loosely mounted two arms, $b\,b$, which connect with the rake-head E, so that when the shaft is coupled to the rake-head and turned in the proper direction the rake-head is raised and its contents are dumped. The coupling mechanism consists of a pinion, $c$, which is feathered on the shaft D, a foot-lever, F, which serves to impart to the pinion a sliding motion, and a rack, $d$, which is secured to the rake-head. By stepping on the foot-lever the pinion is thrown in gear with the rack, and if the shaft is turned in the proper direction the rake-head is raised. From the foot-lever F projects an arm, $e$, so that the rake-head, after it has been raised to the desired height, bears on said arm, and throws the pinion $c$ out of gear with the rack $d$, and thereby the rake-head is released automatically, and allowed to drop back to its working position immediately after its contents have been dumped. In the ends of the shaft D are formed sockets for the reception of pawls $f$, which engage with ratchet-teeth $g$, formed in the interior of the hubs of the wheels. (See Fig. 5.) The pawls are thrown out by suitable springs. When the wheels turn forward the shaft D revolves; but when the wheels turn backward the shaft remains stationary. If the wheels turn forward, therefore, and the coupling mechanism is thrown in gear, the rake-head is raised by the action of the wheels on the shaft D. On the middle of the shaft D is mounted loosely an arm, $h$, which is fastened to the rake-head, and from which extends a stirrup, $i$, Fig. 3, which embraces the hand-lever G. This hand-lever has its fulcrum in a standard, $j$, secured to the frame, and its rear end bears on a stop, $k$, secured to the frame A. (See Figs. 3 and 6.) This stop is tapering, and secured to the frame by a screw, $l$, passing through a slot, so that it can be moved back or forward, and thereby the elevation of the rake-teeth from the ground is adjusted. By means of the hand-lever the rake can be raised at any moment to clear obstructions; but if the rake is raised up by the action of the shaft D, the stirrup $i$ slides down over the hand-lever, and this lever remains stationary, so that it is not liable to be thrown in contact with the person of the driver.

The thill H is secured to the rear bar $m$ of the frame A by screw-bolts $n$, and to the front bar $o$ by staples $p$. An additional pair of staples, $q$, is secured in the front bar $o$, and the rear bar is provided with an additional set of holes for receiving the screw-bolts, so that the thill can be readily changed from a central position toward one side of the frame, and that the horse can be made to walk outside of the material to be raked. In this case the rake works only partially. The staples may be replaced by screw-bolts, and in this case additional holes take the places of the staples $q$.

What I claim as new, and desire to secure by Letters Patent, is—

1. The combination, in a horse-rake, of tubular projections, firmly connected to the main frame, with the wheels which are mounted on said tubular projections, with an independent shaft, which extends through said tubular projections, ratchets and pawls, which connect the independent shaft with the wheels, a rake-head, and a suitable clutch mechanism, all constructed and operating substantially as and for the purpose herein shown and described.

2. The combination, with the shaft D, wheels C, and rake-head E, of a pinion, $c$, feathered on the shaft, a rack, $d$, secured to the rake-head, and a foot-lever, F, substantially as and for the purpose described.

3. The combination, with the independent shaft D, wheels C, and rake-head E, of a pinion, $c$, feathered on the shaft, a rack, $d$, secured to the rake-head, a foot-lever, F, and a releasing-arm, $e$, all constructed and operating substantially as and for the purposes set forth.

4. The combination, with the main frame A, rake-head E, wheels C, and thill H, of two sets of staples or bolt-holes, substantially as and for the purpose described.

In testimony that I claim the foregoing I have hereunto set my hand and seal this 13th day of June, 1877.

HENRY C. VELIE. [L. S.]

Witnesses:
JAMES E. DUTCHER,
PETER VANDERPOOL.